Dec. 28, 1948.  W. J. HARSHBARGER ET AL  2,457,230
AUTOMATIC ELECTRONIC AIRCRAFT
FLIGHT CONTROL OR PILOT

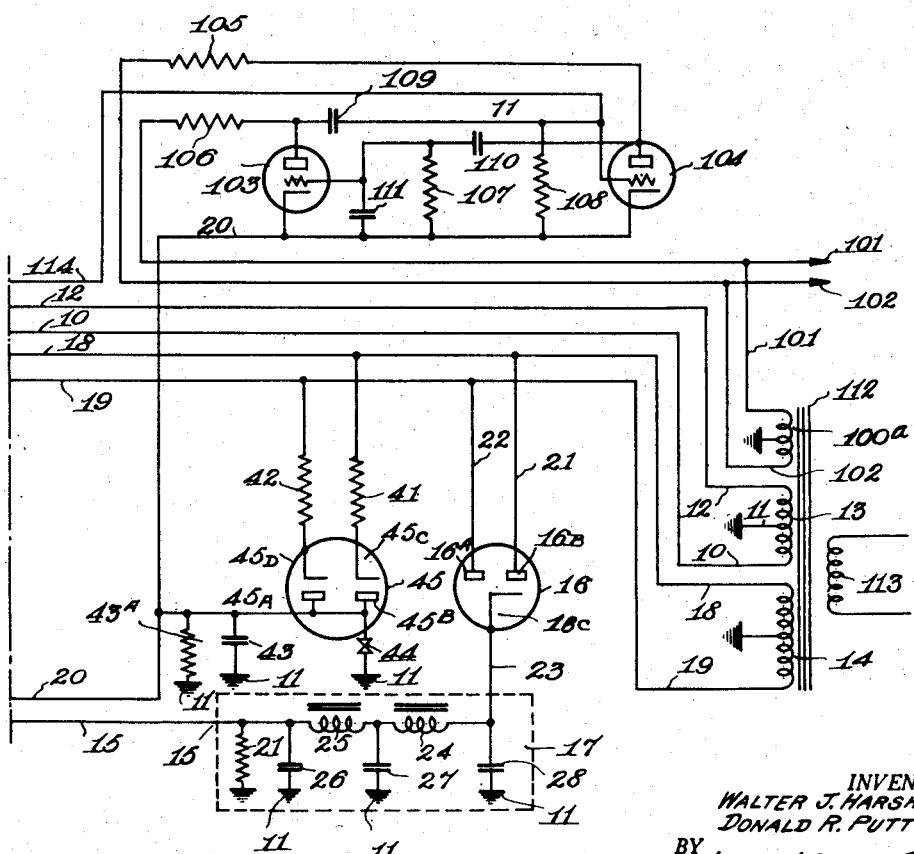

Filed Aug. 27, 1943  5 Sheets-Sheet 5

INVENTORS
WALTER J. HARSHBARGER
DONALD R. PUTT
BY
ATTORNEYS

Patented Dec. 28, 1948

2,457,230

UNITED STATES PATENT OFFICE 2,457,230

AUTOMATIC ELECTRONIC AIRCRAFT FLIGHT CONTROL OR PILOT

Walter J. Harshbarger, New York, N. Y., and Donald R. Putt, Jersey City, N. J., assignors to Rex Cole, New York, N. Y.

Application August 27, 1943, Serial No. 500,226

10 Claims. (Cl. 318—489)

This invention relates to an automatic electronic aircraft flight control or pilot. More particularly, the invention relates to automatic means for controlling or stabilizing the flight of an airplane, in the operation of which means a deviation from a normal or other desired course or conditions of flight is detected and the controls of the airplane actuated automatically in a new and desirable manner to maintain the plane to the desired course or conditions of flight.

The so-called automatic pilots have been known heretofore. In the operation of the conventional automatic pilots in use at this time, a deviation of the airplane from the desired flight conditions, for example, a dip in one of the wings, is detected by a gyroscope and a corrective force applied to the ailerons to return the wings to the desired level position; but the amount of correction applied to the ailerons is generally proportional to the deviation of the plane from the desired level condition. Thus, if a wing dips only a small amount from a level position, the automatic pilot moves the ailerons only a relatively small amount. If the wing dip is larger, the ailerons will be moved further than if the dip is small. Thus, in accordance with these conventional automatic pilots, the corrective force may be regarded as a function of the magnitude of the deviation from the normal or desired conditions.

The previously known automatic pilots also may be operated so that upon large deviations of the airplane from the normal or desired flight conditions (generally above a fixed amount), for example, a relatively big dip by one of the wings, the ailerons would be moved to maximum position and held there until the wings had returned almost to a level position whereupon the ailerons would be moved back to their normal position.

These forms of control are apt to cause overcorrection, and so-called "hunting" or oscillating, either because the greatest magnitude of the corrective force is not applied to return the plane to the desired or normal condition until the plane has actually been moved to the greatest magnitude by the atmospheric or other disturbance, or because the corrective force is retained too long. If the corrective force applied by the automatic pilots is always proportional to the magnitude of the deviation of the plane, it will be apparent that the corrective force is not removed completely until the plane is in normal position. Inertia and other factors cause the plane to move beyond the normal position, and therefore a corrective force in the other direction must be applied. This continues with a tendency for the plane to hunt or oscillate around the normal position. These conventional systems also have the disadvantage either that the full amount of the corrective force needed is not applied until the plane has actually deviated to the maximum position from the normal, or else the corrective force is a maximum. In either event there is the tendency for the plane to be subjected to rather large and violent movements and the consequent motion is unpleasant to passengers and possibly damaging to the cargo and plane.

In accordance with this invention, not only the magnitude of the deviation of the plane from the normal position is detected, but also the rate of deviation, and the corrective force applied is a function of both the magnitude of deviation and the rate of deviation from the normal. Thus if an atmospheric disturbance is such as to cause one of the wings, for example, to dip a relatively large amount, the control constituting the invention determines the rate that the plane starts deviating from the normal, as it moves through the first few degrees. From this rate it is determined that if unchecked the plane would eventually deviate, for example, 20°. Then, in accordance with the invention, a corrective force corresponding to a 20° deviation or a greater corrective force, may be applied to the ailerons as soon as this detection of rate is made. Thus the ailerons are adjusted, not merely in accordance with the magnitude of deviation at the time the corrective force is supplied, but rather in accordance with the magnitude that would eventually take place as determined by the rate of deviation. The full corrective force is applied at once to prevent the major portion of the deviation, rather than after the deviation has occurred. This mode of operation prevents the plane from deviating very far from the normal position and tends to stabilize the position of the plane so that the movement is of relatively small magnitude.

In accordance with the invention, therefore, the corrective forces are applied both in relation to the magnitude of the deviation and the rate of deviation from the normal. The relative proportion between these two factors may be variable and under the control of the pilot. Thus in accordance with the invention, the deviation in magnitude may be considered to be modified by the rate of this deviation, and the extent of this modification is variable. If the amount by which the rate modifies the magnitude is small, the operation of the control approaches that of the conventional prior art described heretofore. On the other hand, if the rate is permitted to modify the magnitude to the maximum extent possible in accordance with the invention, the actual magnitude of deviation of the plane may be extremely small. Because of different types of atmospheric conditions, different types of airplanes and constructions, and the desires of different pilots, the relation between the correction due to deviation in magnitude and rate of deviation may be subject to manual or automatic control.

The action of the automatic control comprising the invention is somewhat like that a pilot uses in flying a plane manually. If the pilot senses that an atmospheric disturbance is of such a nature that it will cause one of the wings to dip 20°, he does not wait until the wing has dipped this amount before moving the aileron to the full corrective position to return the wing to normal position. Rather, he detects, through his experience and intuition, that the disturbance is one of considerable force, and immediately moves the aileron to correct or neutralize an atmospheric force of this amount. Thus, he may be able to prevent the plane from leaving the normal position by more than a very few degrees.

In accordance with this invention by detecting the rate of deviation, and by means of suitable electrical circuits to be described hereinafter, it is possible to control the movements of the ailerons and other controlling parts of the airplane, to hold the airplane in a stabilized position of flight and with a minimum of movement.

It will be seen, in view of the above explanation, that it is an object of the invention to control the flight of an aircraft, or stabilize its flight, by detecting the rate of deviation from the normal position, and utilizing this rate as a corrective factor for controlling and/or stabilizing the flight of an airplane.

It is a further object of the invention to control or stabilize the flight of an airplane in such a manner that the movement of the plane as a result of atmospheric or other disturbances is a minimum, contributing to the comfort of passengers, or the safety of the cargo and plane.

A further object of the invention is the provision of automatic means for controlling or stabilizing the flight of an airplane in which both the magnitude of the deviation and the rate of the deviation are considered and applied for control purposes, and the relative proportion between these two varied at the will of the pilot.

Still a further object is the provision of a control, operable in the manner above described, which is electronic in character, has a minimum number of movable parts, is smooth and sure in operation, and readily constructed and installed.

The invention may be further understood by reference to the drawing forming part of the specification, and in which:

Figures 2, 3 and 4 are to be read together, and illustrate the electrical circuit of a control constructed in accordance with the invention; and Figure 5 is a diagrammatic illustration of the wave form of alternating currents flowing in parts of the circuit in Figures 2, 3 and 4.

Figure 1:
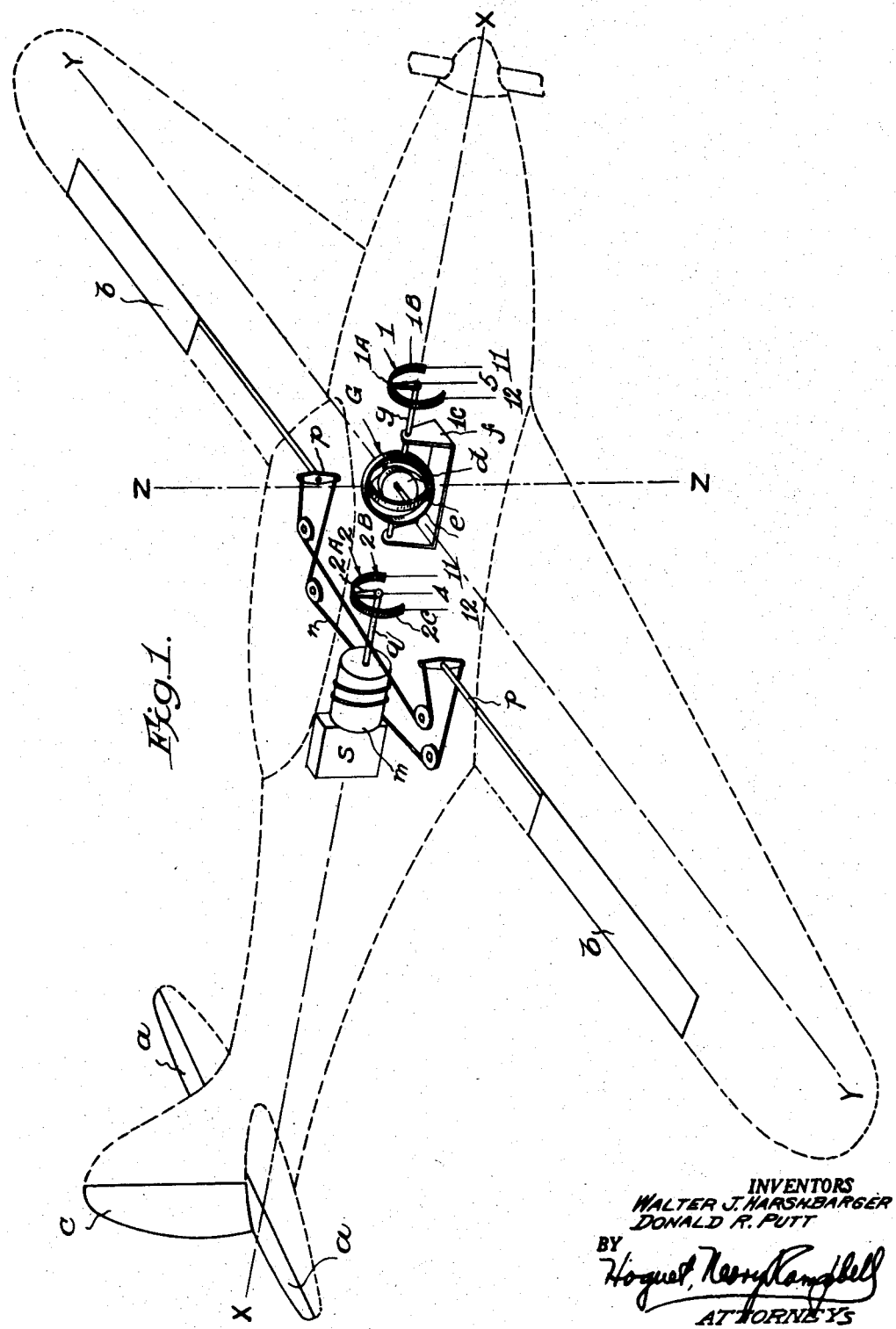
Figure 1 is a perspective illustration of an airplane, in which the invention is shown as applied to the control of the ailerons for illustrative purposes.

Referring more particularly to Figure 1, an airplane is shown diagrammatically. For the purposes of considering stability and motion of the airplane, it may be considered as having three axes. The vertical or Z—Z axis may be considered as perpendicular to the ground when the airplane is in normal flying position. The lateral or transverse axis (Y—Y) is parallel to the ground when the wings of the airplane are level. The longitudinal (X—X) axis is parallel to the ground when the ship is horizontal. When the airplane rotates about the Y—Y axis, the nose goes up or down. This is called "pitch," and is controlled by movement of the elevators $a$. When the airplane rotates about the X—X or horizontal axis, the movement is called "roll" or "blank." This is caused by or controlled by the ailerons $b$. Movement about the vertical or Z—Z axis results in changing direction in which the nose is pointing, or the direction of travel and is called "yaw." This is caused by or controlled by movement of the rudder $c$.

The invention may be applied to control the movement of the airplane about all three axes or in two of them or any one of them. For illustrative purposes, the invention will be described as applied to the control of movement about the X—X or longitudinal axis, and it will be apparent from this description how the invention may be similarly applied to the control of movement about either or both of the other two axes.

Figure 2:
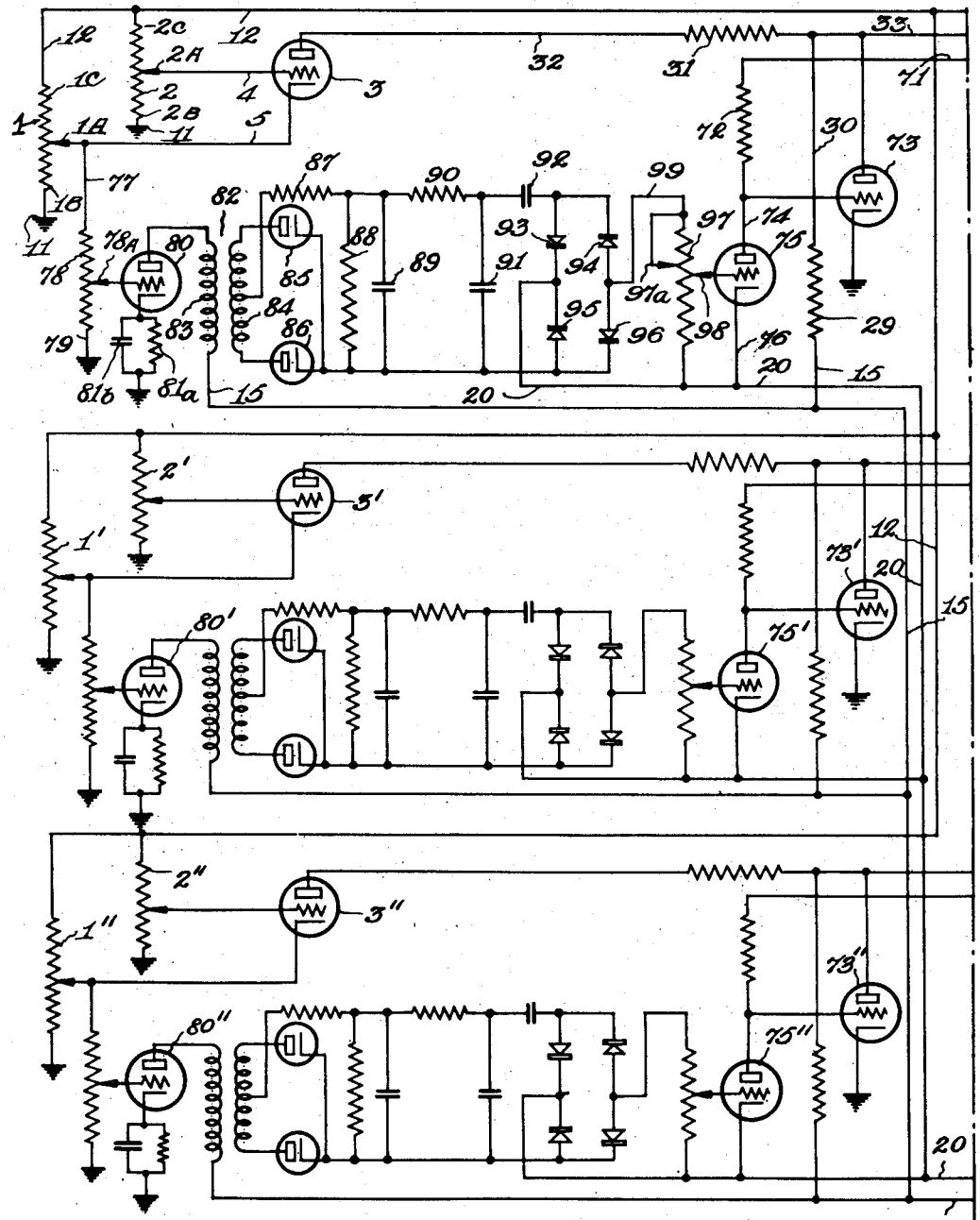

Mounted in the airplane, preferably near the point through which the three axes pass, is a gyroscope G, or other device such as a pendulum, for indicating the movement of the airplane about the X—X axis. If the gyroscope is so constructed, it may also indicate movement about the Y—Y and Z—Z axes. Construction of these gyroscopes is well known, and since they are not a part of the invention, the gyroscope is illustrated diagrammatically. It comprises a rotating member $d$, supported in gimbals $e$, which, in turn, are supported in a fixed support $f$. Extending from the gyroscope is a shaft $g$, which rotates relative to the plane in proportion to the deviation of the plane from the horizontal position about the X—X axis. Mounted on the plane is a potentiometer $I$ having a movable center tap $IA$, which is mounted for rotation by the shaft $g$. Alternatively the center tap may be fixed on the plane and the resistance element $I$ rotated in accordance with the airplane movements. One segment of the potentiometer $I$ on the right side of the center tap $IA$ may be designated as $IB$, and the other segment of the potentiometer may be designated as $IC$. Three wires or electrical conductors $I2$, $5$, and $II$, respectively, are brought from the potentiometer and their position in the electrical circuit as indicated in Fig. 2.

The ailerons $b$ may be actuated by a so-called servomotor $6I$ (Fig. 3) mounted within the housing S having a drive pulley $m$. A flexible cable $n$ is wound around the drive pulley for two or three turns, and carried over suitable pulleys to operate the ailerons $b$ through a leverage arrangement $p$. This construction is well known in the art, and since it forms no part of the invention, it is described and illustrated diagrammatically.

The servomotor may have two windings, so that the pulley $m$ may be rotated in either direction. These windings may be selectively energized by means of relays, as will be described more fully later. The form of servomotor is not particularly critical and any form may be used which will drive the pulley $m$ in either of two directions upon transmission to it of either of two of the electrical impulses. Mounted on the servomotor is a small shaft $q$, which rotates the same amount and in the same direction as the drive pulley $m$. Fixed on the airplane is a potentiometer 2, having a movable center tap 2A, which is mounted for movement by the shaft $q$. Thus, as the servomotor moves in either direction, the center tap 2A will be moved along the resistance element of the potentiometer 2. The portion of the potentiometer on the right side of the center tap is indicated as 2B, and the portion of the potentiometer on the left side of the center tap is indicated as 2C. Wires or conductors 12, 4 and 11, respectively, are brought from the potentiometer 2 and their position in the electrical diagram is shown in Fig. 2.

When the airplane is flying with the wings level, the center tap 1A of the potentiometer 1 and the center tap 2A of the potentiometer 2 are in the center of the resistance elements, respectively of the potentiometers 1 and 2, as shown. If a potential is impressed across the potentiometers, through wires 11 and 12, the potentials at the center taps, as reflected through wires 4 and 5, will be the same. If the plane banks in either direction, this will be detected by the gyro, the center tap 1A will move to either sections 1B or 1C of the potentiometer 1 and there will be a difference in voltage between wires 4 and 5. The magnitude of this voltage will vary directly in proportion with the deviation of the plane from a level position. By means of the invention this voltage is modified in accordance with the rate at which the voltage is developed, as described heretofore, and then amplified. The modified and amplified voltage is then used to operate the servomotor, which moves the ailerons $b$ in the proper direction and in the amount to compensate for the deviation of the airplane, taking into account both the magnitude of the deviation and the rate of deviation, as determined by the voltage, and the rate of change in the voltage, respectively, between the conductors 4 and 5.

As the corrective force exerted by the ailerons $b$ returns the plane to the normal position, the difference in potential between the conductors 4 and 5, depending upon the magnitude, and the rate at which the voltage is developed causes the servomotor to continuously adjust the ailerons in accordance with the method described generally heretofore, so that the airplane will be prevented from overrunning the normal position. This mode of operation prevents hunting and also prevents the airplane from deviating to any appreciable extent from the normal position; or if there is a deviation, it will be caused to return to the level position. When the difference in potential between the conductors 4 and 5 disappears, the plane will proceed in its normal and level course.

It will be apparent that the elevators $a$, or the rudder $c$, and both of them may be controlled in the same manner, and such control is within the invention, but a repetitious explanation is not believed necessary.

Figure 3:
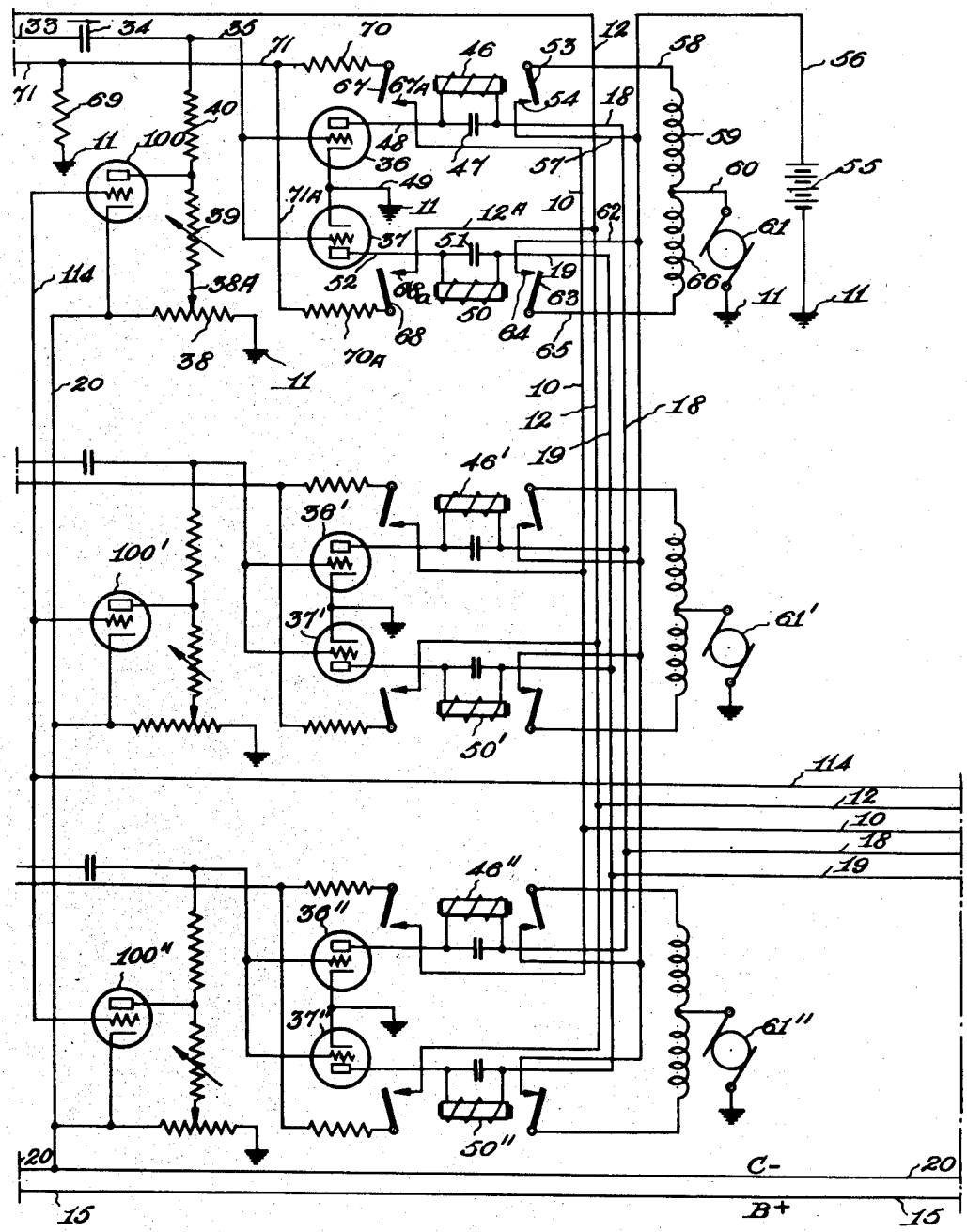

The manner in which the difference in potential between the conductors 4 and 5 in relation to the potential applied across the potentiometers 1 and 2 is used to achieve the control of the type described will be understood from a consideration of Figs. 2, 3 and 4.

In these figures, three separate channels are shown, operated by a common power supply; one channel is utilized to control the movement of the ailerons $b$, the second channel is utilized to control the movement of the elevators $a$, and the other channel is utilized to control the movement of the rudder $c$. The operation of only one channel will be described in detail, namely, that used to control the operation of the ailerons, since it will be obvious to one skilled in the art, in view of this description, how the other two channels may be used to control the operation of the elevators and rudder, respectively.

In the upper left-hand portion of Fig. 2 the potentiometers 1 and 2 referred to in Fig. 1, are illustrated together with the center taps 1A and 2A. The outer ends of the segments 1B and 2B of the potentiometers are each grounded at 11 and an A. C. potential is supplied through the wire 12 from the secondary 13 of the transformer 112 (Fig. 4).

The center tap 2A of the potentiometer 2 is connected through wire 4 to the grid of a triode 3. A center tap 1A of the potentiometer 1 is connected through wire 5 to the cathode of the triode 3. Thus a difference in potential between the wires 4 ant 5, which is developed when the plane starts to bank, is impressed between the cathode and grid of the tube 3 and the amplified voltage developed in the plate circuit is in proportion to the magnitude of the deviation of the plane from horizontal. The plate voltage for the tube 3 is supplied from the plate supply line 15, through the plate resistance 29, wire 30, resistance 31 and wire 32. The A. C. output of the tube 3 passes through wire 32, resistance 31, wire 33, condenser 34 and wire 35, and is impresed upon the grids of the tubes 36 and 37. The latter two tubes operate the relays 46 and 50 which in turn control the operation of the servomotor 61.

Upon actuation of relay 46 contacts 53 and 54 are closed which causes the servomotor 61 to drive in one direction by passing current from the battery 55 through the wires 56, 57, contacts 54 and 53, wire 58, motor field 59, wire 60, armature 61 to ground 11. The closing of contacts 53 and 54 may also serve to operate clutches of electric or hydraulic servomotors, or valves of hydraulic motors, or other similar motive means. The relay 46 has a second set of contacts 67 and 67A which are also closed upon actuation of the relay for a purpose to be described hereinafter.

Upon actuation of relay 50 contacts 63 and 64 are closed which causes the servomotor 61 to drive in the other direction by passing current from the battery 55 through the wires 56, 62, contacts 64 and 63, wire 65, motor field 66, wire 60, armature 61 to ground 11. The relay 46 has a second set of contacts 68 and 68A which are closed upon actuation of the relay for a purpose to be described hereinafter.

The actuation of the servomotor in response to the voltage delivered from the tube 3 will be in proportion to the voltage differential between the center taps 1A and 2A and thus directly in proportion to the magnitude of deviation of the plane from the normal.

There will now be described the portion of the circuit which relates to the control based upon the rate of deviation and the manner in which this modifies the control based upon the magnitude of deviation.

The center tap 1A of the gyroscope potentiometer 1 is connected through the wire 77 to one end of a gain control potentiometer 78 having a center tap 78A; the other end 79 of the potentiometer 78 is grounded. Thus the potential between the center tap 1A of the gyroscope potentiometer 1 and ground is impressed across the potentiometer 78. The center tap 78A is connected to the grid of the triode 80. By means of the potentiometer 78 and the center tap 78A, which is manually variable by the pilot, any proportion of the potential between the center tap 1A and ground may be impressed upon the grid of the triode 80, depending upon the position of the center tap 78A upon the resistance 78.

The tube 80 is self-biased by means of the resistance 81a and the condenser 81b. The plate voltage for the tube 80 is supplied from the plate voltage supply line 15 through the primary 83 of the transformer 82.

The output of the tube 80 is impressed across the primary 83 of the transformer 82. The output of the secondary 84 of the transformer 82 is fed to two diodes 85 and 86 and rectified thereby. The rectified output is filtered by means of resistors 87, 88, 90 and condenser 89. The rectified and filtered output is then applied across the condenser 91. As the magnitude of the D. C. voltage impressed across the condenser 91 increases or decreases, the condenser 92 will accordingly charge or discharge through the rectifiers 93, 94, 95, 96 and current will flow through the resistor 97. The magnitude of the voltage appearing across the resistor 97 will be a function of the current flowing through it, which current is developed by the charge or discharge of the condenser 92. Inasmuch as the charge or discharge of the condenser 92 is dependent upon a change of conditions and introduces a time factor, the voltage impressed across the resistor 97 will be a function of the rate of change of the A. C. voltage apearing between the center tap 1A of the gyroscope potentiometer 1 and ground 11.

Center tap 98 in the potentiometer resistance 97 is connected to the grid of the triode 75. The cathode is connected through wire 76 to the negative or C bias supply line 20. The plate of the tube 75 is connected through wire 74 to the grid of tube 73. The cathode of tube 73 is connected to ground and the plate of the tube 73 is connected to the wire 33.

Current flows through the tube 75 from ground 11, resistor 69, wire 71, resistor 72, wire 74, plate to cathode of tube 75, wire 76, and wire 20 to grid bias rectifier 45. This plate current biases the grid of the tube 73 below cut-off except when the rate of change of the A. C. voltage between the center tap 1A of the gyroscope potentiometer and ground exceeds a given rate. When the voltage impressed on the center tap 98 exceeds the given value, the plate current in tube 75 decreases, lowering the negative grid bias of tube 73 to such an extent that the positive cycles of the A. C. voltage impressed across resistor 69 causes plate current to flow in tube 73 during these positive cycles. Thus the plate of tube 73 passes current and its A. C. output voltage is then added to the A. C. output of tube 3 when the A. C. exciting voltage and the output voltage of tube 75 exceed the cut-off point. The resistor 97 and the center tap 98 provide adjustment for varying the operating point at which the tube 75 allows the tube 73 to pass current. This can also be varied by changing the value of the resistor 97 by means of the contact 97a.

The A. C. exciting voltage developed across the resistor 69 and applied to the grid of tube 73, as described in the previous paragraph, is supplied through wire 71 and is applied to the grid of the tube 73 by the closing of either relay 46 and associated contacts 67 and 67A, or relay 50 and associated contacts 68 and 68A. When the relay 46 is closed the circuit may be traced from one side of secondary 13 of the transformer 112 through wire 10, contacts 67A, 67, resistance 70, wire 71, resistance 72 to the grid of the tube 73. When the relay 50 is closed the exciting voltage applied to the grid of the tube 73 will be of the opposite polarity and is obtained from the other half of the secondary 13 of the transformer 112, through wires 12, 12a, contacts 68A, 68, resistance 70A, wires 71A, 71 and resistance 72 to the grid of tube 73.

When the rate of change of the voltage between center tap 1A and ground is large enough so that the tube 73 is biased above cut-off, the A. C. output of the tube 73 is fed into wire 33 and added to the output of the tube 3. This in effect expands the A. C. voltage developed by the tube 3, which expanded voltage is applied to the grids of the tubes 36 and 37.

When the rate of dip of the wings of the airplane is relatively great, and the rate of voltage change between center tap 1A and ground is also relatively great, the voltage developed across resistor 97 will be relatively great, and the voltage added to the output of tube 3 will be relatively great. Thus the greater the rate of deviation, the greater will be the movement of the servomotor as controlled by the tubes 36 and 37 and the relays 46 and 50.

The extent to which the output of tube 3 is modified by the tubes 80 and 73 may be controlled by the potentiometer 78 as explained previously.

Reference has been made previously to the plate voltage supply line 15 and the negative or C bias voltage supply line 20. These voltages are provided by a power transformer 112 and an appropriate rectifier.

The power transformer 112 has a primary winding 113 which is connected to the airplane's A. C. power supply, and a secondary winding 14 the center of which is grounded at 11. The output of the secondary 14 is carried through wires 18 and 19, to wires 21 and 22, and to the plates 16A and 16B of the rectifier tube 16. The cathode 16C of the tube 16 is connected to the wire 23 which leads to a filter generally indicated within dotted lines as 17. The filter includes chokes 24, 25, condensers 26, 27 and 28 and a resistor 21. The filter output is supplied to the line 15 as shown at the bottom of Fig. 4, and the plate voltage supply appears between wire 15 and ground 11.

The negative or C bias voltage supply, which appears between the ground 11 and wire 20 is also provided by the secondary 14 of the transformer 112. The circuit supplying the C bias voltage may be traced from the ground 11, resistance 43A, plates 45A and 45B, cathodes 45C and 45D of the tube 45, resistors 41 and 42, wires 18 and 19 to the center tap of the winding 14 of the transformer 112. A voltage regulator tube 44 is provided between the plates 45A and 45B and ground 11 to maintain the C bias voltage substantially constant; a condenser 43 between the cathodes 45A, 45B and ground serves as a filter.

The "C" bias for tubes 36 and 37 is obtained by the drop across the resistance 38 from wire 20 to ground 11. The amount of "C" bias may be varied by the center tap 38A and may be traced from 38A, resistances 39, 40 and wire 35 to the grids of tubes 36 and 37.

The secondary 14 of the transformer 112 through wires 18 and 19 also supplies the voltage for the operation of the relays 46 and 50 and the plate voltage for tubes 36 and 37. These circuits may be traced as follows: For the tube 36 and the relay 46 the voltage appears from the winding 14, wire 18, through the winding on the relay 46 and condenser 47, wire 48, to the plate of the tube 36, through the tube to wire 49, and ground 11. The circuit to the tube 37 and relay 50 may be traced from the winding 14, wire 19, winding of the relay 50, and condenser 51, wire 52, to the plate of the tube 37, through the tube 37 to wire 49 and ground 11. The condensers 47 and 51 are used to avoid chatter of the relays because they are operated by A. C. current.

Since the voltage developed in the winding 14, and supplied over the wires 18 and 19, is alternating, the polarity in the windings of the relays 46 and 50 and the polarity of the voltage applied to plates of the tubes 36 and 37 in respect to the polarity of the voltage applied to the grids of the tubes 36 and 37, will determine which tube passes current and which one of the relays 46 or 50 will be operated.

The power transformer 112 also includes a secondary winding 100a which terminates in wires 101 and 102 which operate a multi-vibrator circuit including tubes 103, 104 (Fig. 4). The multi-vibrator tubes 103 and 104 provide a pulse voltage which appears over wire 114. The frequency of the pulse is adjusted to a subharmonic of the frequency of the A. C. power supply. For example, if the power supply is 60 c. p. s., the pulse may be 15 c. p. s. The tubes 103 and 104 therefore act as a frequency divider whose output frequency is in a direct phase relationship with the line frequency but is a sub-multiple thereof.

The multi-vibrator synchronizing circuits may be traced from the winding 100a, over wires 101, 102, plate resistors 105, 106, to the plates of the multi-vibrator tubes 103, 104, respectively, through these tubes to the wire 20, rectifier tube 45, resistors 41 and 42, to the ground 11 through the center tap of the winding 14 of the transformer 112. The multi-vibrator includes grid resistors 107, 108, coupling condensers 109, 110 and a condenser 111 for shaping the outline of a pulse provided by the multi-vibrator.

The output of the multi-vibratory tubes 103 and 104 appears between the wire 114 and wire 20. The wire 114 is connected to a grid of a triode 100 and the wire 20 is connected to the cathode of tube 100. The pulse provided by the multi-vibrator is therefore impressed upon the buffer tube 100. The output of the tube 100 is fed into one end of each of the resistors 39 and 40. The outer end of the resistor 39 is connected to the center tap of the variable resistor 38 which is connected across the wire 20 and ground 11. The other end of the resistor 40 is connected to the grids of the tubes 36 and 37 through the wire 35. The output of the tube 100 therefore biases the grids of the tubes 36 and 37 periodically in accordance with the frequency pulse provided by the multi-vibrator and in this way the operating point of the relays 46 and 50 is periodically changed. This circuit provides an anti-hunting control for the servo motor, and also functions as a vernier slow-down device and allows the servo motor to respond to very small deviations as detected by the gyroscope.

The operation of the multi-vibrator and the manner in which the tube 100 controls the operation of the relays 46 and 50 through the tubes 36 and 37 may be further understood from a consideration of Fig. 5 which is a diagrammatic illustration of the wave form of certain of the alternating currents flowing in parts of the circuit and the voltages applied thereto. The alternating pulse supplied by the multi-vibrator tubes 103 and 104 through the wire 114 has the form indicated at 201. This is a relatively square wave in view of the constants of the multi-vibrator circuit, particularly the condenser 111. The voltage applied to the plate of the tube 36 is indicated at 202 and the voltage applied to the plate of the tube 37 is indicated at 203. It will be seen that the polarities of the voltage applied to the tubes 36 and 37 are always opposite in phase and that th efrequency of the pluse in the wire 114 may be a sub-multiple of the frequency applied to the plates of tubes 36 and 37. At the beginning of a cycle of the pulse, as at the points indicated by 201a, 202a, 203a, the voltage applied to the plate of the tube 36 starts to become positive and the voltage applied to the plate of tube 37 starts to become negative. The voltage applied to the tubes goes through two complete cycles while the pulse voltage remains positive and through two additional complete cycles while the pulse remains negative.

The line 204 indicates the maximum voltage that may be applied to the grids of the tubes 36 and 37 (by the adjustment of the resistor 38) and the relays 46 and 50 remain unactuated, that is, when voltages of this amount or less are applied to the grids of tubes 36 or 37 the current passing through the tube and relay is not sufficient to hold the relay contacts closed. The line 205 indicates the minimum voltage that may be applied to the grids of tubes 36 and 37 and have the relays 46 and 50 actuated, that is, when voltages of this amount or greater are applied to the grids of tubes 36 and 37, the current flowing through the tubes and relays is sufficient to close the relay contacts.

The line 206 represents the pulse bias voltage normally applied to the grids of the tubes 36 and 37 which is less than that which causes the relays to operate. The voltage (C), which normally is applied to the grids of tubes 36 and 37, is determined by the voltage drop in resistor 39 in the plate circuit of buffer tube 100. This may be varied by adjusting the resistor 38. Since the voltage (C) may be increased or decreased, this affords a control for the difference between normal plate voltage 206 and the relay drop-out voltage 204 (the difference being represented by D). It will be seen that by means of the variable resistor 38 which varies the distance D between the voltages 204 and 206, the sensitivity of the control may be varied. Thus when D becomes greater the sensitivity is reduced.

The A. C. voltage applied to the plates of the tubes 36 and 37 is indicated at 207. However, since no A. C. grid bias is impressed upon the grids of either tubes 36 or 37, these tubes will be biased at the voltage indicated by line 204.

When an A. C. voltage, indicated at 208, is impressed upon the grids of the tubes 36 and 37, the tube 36 passes two cycles of plate current to the relay 46 for every cycle of the pulse current 201, the other two cycles are being eliminated as shown at 209. When the polarity of the A. C. voltage on the grids of the tubes 36 and 37 is reversed, as shown at 210, the tube 37 will pass two cycles of plate current for each cycle of the pulse current 201; the other two cycles will be dropped out as indicated at 211. It will be seen that either the relay 46 or 50, depending upon the polarity of the grid voltage, is energized and deenergized continuously when the deviations indicated by the gyroscope potentiometer are small and when the voltage developed from the tube 3 are impressed upon the grids of the tubes 36 and 37 are small. This permits small pulses of current to flow through the fields 59 or 66 of the servo motor and gives very accurate control thereof.

When the deviations of the airplane are larger, or when the rate of change is larger so that the voltage developed by the tube 3 as modified by the tube 73 is larger, the voltage applied to the grids of the tubes 36 and 37 is larger and fills the trough of the pulse voltage as indicated at 212 so that all of the current is passed through the tube 36 or 37 for every cycle (as distinguished from every two being dropped out) so that the relay is energized continuously and does not make and break the relay contacts intermittently.

The method of operation will now be described for illustrative purposes. Let it be assumed that the right wing (facing the plane, Figure 1) drops slightly and not at an excessive rate. The center tap 1A on the gyroscope potentiometer 1 will move into the potentiometer segment 1C, and an A. C. voltage will appear between wires 4 and 5 and the grid and cathode of the tube 3. If at that instant the A. C. voltage in the wire 12 is in the positive part of the cycle, the grid of the tube 3 would be negative, thereby reducing the plate current of the tube 3. This causes the plate coupling condenser 34 to become charged as a result of current flowing from the wire 15 through plate resistor 29 through wires 30, 33, condenser 34, resistors 40, 39, 38 to ground 11. This charging current also lowers the negative grid bias supplied to the grids of the tubes 36 and 37, since it alters the drop across the portion of the resistor 38 which provides the "C" bias.

At the same instant the A. C. voltage in the wire 18 is also in the positive part of the cycle, and as a result the plate voltage of tube 36 will be positive. As a result of the lowering of the negative grid bias on the grid of tube 36 and the positive plate voltage applied thereto, current will flow through tube 36 and through relay 46 to energize it. Since at the same instant the plate voltage applied to tube 37, and at the same instant the voltage in the wire 19 is in the negative part of the cycle, the plate voltage of tube 37 will be negative. As a result, no current will flow through tube 37 and the relay 50 will remain open.

Relay 46, upon being energized by the flow of current through tube 36, closes contacts 53 and 54 causing the servomotor 61 to be operated in one direction by the flow of current from the battery 55 through the field 59, moving the ailerons to a position so as to cause the right wing to be lifted. As the servomotor rotates, the center tap 2A of the servomotor potentiometer 2 is driven towards the segment 2C. When the voltage between the center tap 2A and ground becomes equal to the voltage between center tap 1A and ground, no differential A. C. voltage will appear between the grid and cathode of tube 3 and no current will flow through condenser 34. The voltage applied to the grid of tube 36 will therefore be that of its normal biased constant. This will lower the plate current of tube 36 and the relay 46 will be deenergized. Contacts 53 and 54 will open and the servomotor 61 will stop. Since the ailerons have been moved by the servomotor 61, a lifting force will be applied causing the right wing to rise.

It is assumed in this example that the rate at which the wing is raised is not excessive. As the right wing rises, the gyroscope potentiometer center tap 1A will be moved toward its normal position, and the potential of the center tap 1A above ground will be lower than the potential of the center tap 2A above ground. This results in a positive voltage being applied to the grid of the tube 3, and the plate current of tube 3 will increase. Condenser 34 discharges through tube 3 to ground and from ground through resistors 38, 39 and 40 to the condenser. Because of this flow of current through a portion of the resistor 38, the negative bias on the grid of tube 36 is increased and thus relay 46 is prevented from operating.

However, when the line voltage changes its polarity in the next half of the cycle, the voltage applied to wire 12 will be negative and the grid of tube 3 will become positive. Thus during the second part of the cycle, the condenser 34 will discharge so as to lower the negative bias on the grids of tubes 36 and 37 due to the flow of current through a part of the resistance 38. Also since during this part of the cycle wire 19 is positive current flows from wire 19 through relay winding 50, wire 52, tube 37, wire 49 to ground 11, relay 50 therefore becomes energized and contacts 63 and 64 are closed causing current to flow through the field 66 of the servomotor 61 driving it in an opposite direction.

The servomotor 61 continues to rotate so as to move the ailerons to a position to reduce the lift being applied to the right wing. This action will continue until the right wing arrives at its normal or level position at which the center tap 1A of the gyroscope potentiometer and center tap 2A of the servomotor potentiometer will both be at their normal or center position.

In this assumed example the rate at which the right wing dips is not excessive so that the voltage developed across the resistor 97 is less than that which would permit current to flow through the tube 73 and as a result the output of the tube 3 would not be expanded by the output of tube 73.

When either of the relays 46 or 50 are energized as explained heretofore, the contacts 67 and 67A and 68 and 68A, respectively, are closed. However, because the rate of deviation of the wing was not excessive, the circuit created by the closing of these contacts is not such as to alter the operation of the servomotor. Upon closing of contacts 67 and 67A, current would be permitted to flow from the wire 19 through resistance 70 and 69 to ground. Current may also flow from the wire 71 through resistance 72, tube 75 to the C bias supply line 20. However, since the rate at which the right wing dipped was not excessive and the drop across resistor 97 is low, the plate current of tube 75 is maximum which biases the tube 73 to cut-off. The voltage drop across resistors 69 and 72 supplies the negative cut-off voltage for the grid of tube 73. As a result there is no output voltage from tube 73 to expand the voltage of tube 3.

Similarly when relay 50 is energized contacts 68 and 68A are closed permitting current to flow from wire 12 through resistor 70A, wire 71A, 71, resistor 69 to ground 11, and from wire 71 through resistor 72, tube 75 to wire 20. Since, however, the rate at which the right wing was returned was not excessive, as assumed heretofore, the tube 73 would remain at cut-off and the voltage output of tube 3 would not be expanded by tube 73 as explained heretofore.

In the previous description of the operation of the control, it has been assumed that the rate of deviations of the wings from the normal attitude or level position did not exceed a given predetermined value which is determined by the setting of the center tap 78A on the resistor of the potentiometer 78 and the center tap 98 on the resistor 97. In the illustrative example of the invention now to be described, it is to be assumed that the right wing has dropped at a rate exceeding the given determined value. For example, a weather disturbance exerting a great pressure on the right wing may be of such a magnitude as to move the wing ultimately through a 20° angle. When such a force is applied, the right wing starts dropping at a faster rate than if only a small force were applied, such as would move it through 2° or 3°. Thus the rate at which the wing starts to drop is an indication of the amount of force applied to it, and the position to which the wing ultimately may be expected to move.

When such a large force is applied, the right wing drops and the center tap 1A of the gyroscope potentiometer moves towards the segment 1C. The grid of the tube 3 becomes negative which in turn would cause the grid of the tube 36 to become positive, causing the relay 46 to operate as described heretofore. This causes the servomotor 61 to drive the aileron in a direction to lift the right wing.

Under such conditions the A. C. voltage across the segment 1B of the gyroscope potentiometer and ground also is increased; the voltage drop across the resistor 78 is increased; and the voltage at the center tap 78A is increased. This in turn causes the plate current of the tube 80 to increase. The increased current flowing through the primary 83 of the transformer 82 results in an increased A. C. voltage across the secondary 84 and in turn increases the filtered D. C. output of the diodes 85 and 86 as applied across the condenser 91. As the D. C. voltage across the condenser 91 increases, the condenser 92 will draw current and become charged. This charging current flows from the cathodes of 85 and 86 through the rectifier 95, wire 20, resistor 97, wire 99, rectifier 94 and through condenser 92. A voltage is developed across the resistance 97 only when there is a change in voltage across the segment 1B of the gyroscope potentiometer and because of the time constants and other properties inherent in the condenser the amount of current flowing through it is a function of the rate of change. Thus the voltage developed across the resistance 97 is a function of the rate of change of the A. C. voltage appearing across the segment 1B of the gyroscope potentiometer.

The voltage developed across the resistance 97 is impressed upon the center tap 98; the grid of the tube 75 is biased negative and the plate current of tube 75 decreases. The grid of tube 73 is normally biased below cut-off because of the drop across resistors 69 and 72. However when the voltage developed across the resistance 97 lowers the plate current through the tube 75 the voltage drop across resistor 69 and 72 decreases and the grid of the tube 73 is raised above cut-off and the tube passes plate current.

The polarity of the A. C. voltage across the ressitors 70, 69 and 72 as a result of the closing of contacts 67 and 67A by the actuation of the relay 46 is such as to make the grid of the tube 73 in the same phase as the grid of the tube 3. This A. C. voltage, when the grid of the tube 73 biased above cut-off, modulates the plate current in such a manner as to expand the A. C. voltage out-put of the tube 3.

Assume for the sake of description that the right wing has started to dip as a result of a force which will eventually cause it to move 20°. By the time it has reached 2°, for example, the output of tube 3 alone would cause the servomotor to drive the ailerons to a point where the center tap 2A of the servomotor potentiometer is equal to the 2° position of the gyroscope potentiometer center tap 1A. However, because of the expansion voltage injected by the tube 73 into the output of tube 3 and onto the grids of tube 36 and 37 the relay 46 will be held energized by this higher voltage and cause the servomotor to continue to rotate the ailerons past the balanced position. This aileron overdrive will continue until the voltage across the resistor 97 decays through the condensers. Thus while the airplane has moved only through 2°, the movement of the aileron is greatly past the balanced position and counteracts the weather force applied to the right wing before the wing had an opportunity to move through the greater distance that it otherwise would.

As the voltage across the resistance 97 decays the tube 73 is biased to cut-off and the expansion voltage is withdrawn from the output of the tube 3. The servomotor and aileron position is now beyond the balanced position and the A. C. voltage of the opposite polarity is now impressed upon the grid of the tube 3. The polarity of the output voltage of the tube 3 is reversed and relay 46 is deenergized. As soon as the next half of the A. C. cycle occurs, relay 50 is energized, causing the servomotor 61 to reverse direction and the aileron is driven back to a balanced position with the gyroscope. The aileron is not moved to its normal position but only to that which balances the position of the plane as indicated by the gyroscope. The lift therefore is still supplied to raise the right wing. As the wing returns to normal attitude, the center tap 1A of the gyroscope potentiometer will also move to the center position and the servomotor and aileron will return to their normal position in the manner described previously.

Under some circumstances the wing may move at a rate exceeding the predetermined value as it is returning to the level position. For example, the weather force acting upon the right wing may be suddenly withdrawn and the aileron may be in an advanced position tending to raise the right wing. If the rate of return of the right wing to level position is excessive, the A. C. voltage across the gyroscope segment 1B of the gyroscope potentiometer would collapse at a rate sufficient to cause the condenser 92 to discharge through rectifier 93, wire 20, resistor 97, wire 99, rectifier 96, again impressing a negative bias upon the tube 75 which would raise the grid of tube 73 above cut-off in the manner described previously. The relay 50 is now energized and through closed contacts 68 and 68A on A. C. voltage is applied from wire 12, through resistor 70A over wire 71, through resistor 72 to the grid of tube 73. The output voltage of tube 73 expands the output voltage of tube 3 thus holding the relay 50 energized. The servomotor continues to drive the aileron towards or beyond normal position until movement of the wing is decelerated, at which time voltage across the resistor 97 will have decayed, removing the expansion voltage applied by the tube 73. The servomotor will then continue to drive the aileron until the wing is in normal or level position and the center taps 1A and 2A of the potentiometer are balanced, whereupon the relay 50 will be deenergized.

The invention has been described more particularly for illustrative purposes in controlling the movement of the wings about the X—X axis. The invention contemplates also the control of the elevators a by a servomotor 61' and of the rudder c by a servomotor 61''. These are controlled through gyroscope potentiometers 1' and 1'' respectively and servomotor potentiometers 2' and 2'' respectively. The circuits are similar, employing tubes 3', 80', 75', 73', 100', 36', 37', 3'', 80'', 75'', 73'', 100'', 36'', 37'', respectively, to control the operation of relays 46', 50' and 46'', 50'', respectively. These circuits may be operated from the same power source and from the same voltage supply wires 10, 12, 15, 18, 19, 20 and 114. It is believed unnecessary to repeat in detail the description and operation of the circuits for the control of the elevators and the rudder.

It will be apparent that the invention may be applied to control the movements of the plane about any one, two or three axes. For example, the invention may be applied only to the control of the rudder to keep the ship upon its proper course. Alternatively, it may be applied to control only the ailerons and the elevators if the course is to be determined by the pilot.

When the invention is to be applied to the control of the plane about more than one axis, for example, control of the rudder and ailerons, the operation of these two may be somewhat dependent upon each other. Thus the movement of the rudder to alter the course may require movement of the ailerons so that the ship may bank properly as it makes a turn. The modification or interrelation of the voltages may be made at any point and may take place either before the voltages are applied to the potentiometer at 1' or 1''; or after they are fed into the control, for example, by mixing of the outputs from the tubes 3 and 3' before or after expansion by the tubes 73 and 73'.

The invention resides in a novel method of control as well as the preferred apparatus disclosed, and it is apparent that any number of different apparatus may be used. For example, if it is desired to control hydraulically actuated servomotors, it is necessary only that the controlling elements of the airplane be actuated in response to and in proportion to the output voltage of the tubes 3, 3', and 3'' as expanded by the tubes 73, 73' and 73''. It will also be obvious that many modifications and electrical equivalents will be apparent to those skilled in the art in view of the explanation of the method herein. We intend all of the same to be included as within the scope of the following claims.

We claim:

1. In a device for controlling and stabilizing an airplane, means for expressing the magnitude of movement of the airplane about at least one of its axes in terms of a voltage, a circuit including a condenser, variable means for dividing said voltage, means for impressing a divided part of said voltage into said circuit to develop a second voltage as a function of the rate of change of the first mentioned voltage, and means for impressing said second voltage upon said first voltage to develop a controlling voltage which can be used in controlling the airplane.

2. In a device for controlling and stabilizing an airplane, means for expressing the magnitude of movement of the airplane about at least one of its axes in terms of a voltage which is a function of said magnitude, a circuit including a condenser into which said voltage is impressed to develop a voltage which is a function of the rate of deviation, means for developing a voltage as a function of said rate voltage and means for impressing said developed voltage upon said first voltage, when said developed voltage is above a predetermined amount to result in a controlling voltage which can be used in controlling the airplane.

3. In a device for controlling and stabilizing an airplane, means for expressing the magnitude of movement of the airplane about at least one of its axes in terms of an alternating current voltage which is a function of said magnitude, means for rectifying said voltage, a circuit including a condenser into which said rectified voltage is impressed to develop a direct current voltage which is a function of the rate of deviation, means for developing an alternating current voltage as a function of said rectified voltage when it exceeds a given value and means for impressing said developed voltage upon said first voltage to form a controlling voltage which can be used in controlling the airplane.

4. In a device for controlling and stabilizing an airplane, means for expressing the magnitude of movement of the airplane about at least one of its axes in terms of an alternating current voltage which is a function of said magnitude, means for rectifying said voltage, a circuit including a condenser into which said rectified voltage is impressed to develop a direct current voltage which is a function of the rate of deviation, means for developing an alternating current voltage as a function of said rectified voltage when it exceeds a given value, means for varying said given value and means for impressing said developed voltage upon said first voltage to form a controlling voltage which can be used in controlling the airplane.

5. In a device for controlling and stabilizing an airplane equipped with a gyroscope and with a servomotor for operating the controls of the airplane, means for controlling the operation of the servomotor in accordance with variations in a controlling voltage comprising in combination a potentiometer connected to said gyroscope, means for impressing an alternating current voltage across said potentiometer, a potentiometer connected to said servomotor, means for impressing an alternating current across said latter potentiometer, whereby movement of the airplane or movement of the servomotor will result in a difference in alternating current potential between the two potentiometers, means for amplifying this potential, means for rectifying at least a portion of this potential, a condenser and a resistor in series across the rectified potential whereby a direct current potential is developed across said resistor which is a function of the rate of change of said first mentioned potential, means for developing an alternating current potential as a function of said direct current potential, means for amplifying said developed alternating current potential, means for combining said two amplified potentials to develop the controlling potential for use in the operation of the controlling means.

6. In a device for controlling and stabilizing an airplane equipped with a gyroscope and a servomotor for operating the controls of the airplane, means for controlling the operation of the servomotor in accordance with variations in a controlling voltage comprising in combination a potentiometer connected to said gyroscope, means for impressing an alternating current voltage across said potentiometer, a potentiometer connected to said servomotor, means for impressing an alternating current voltage across said second mentioned potentiometer, whereby movement of the airplane or movement of the servomotor will result in a difference in the alternating current potential between the two potentiometers, means for amplifying this potential, means for rectifying this potential, two condensers in parallel and a resistor in series therewith, means for impressing the rectified potential across the condensers whereby a potential is developed across said resistor which is a function of the rate of change of said first mentioned potential, means for developing an alternating current potential as a function of said direct current potential when the latter exceeds a given value, means for amplifying said developed potential, and means for combining said two amplified potentials, whereby controlling voltage is developed that may be used to control the operation of said controlling means.

7. In a device for controlling and stabilizing an airplane equipped with a gyroscope and a servomotor for operating the controls of the airplane, means for controlling the operation of the servomotor in accordance with variations in a controlling voltage comprising in combination a potentiometer connected to said gyroscope, means for impressing an alternating current voltage across said gyroscope, a potentiometer connected to said servomotor, means for impressing an alternating current voltage across said second mentioned potentiometer, whereby movement of the airplane or movement of the servomotor will result in a difference in the alternating current potential between the two potentiometers, means for amplifying this potential, means for rectifying this potential, two condensers in parallel and a resistor in series therewith, means for impressing the rectified potential across the condensers whereby a potential is developed across said resistor which is a function of the rate of change of said first mentioned potential, means for developing an alternating current potential as a function of said direct current potential when the latter exceeds a given value, means for amplifying said developed potential, means for combining said two amplified potentials, a power tube operable by said combined potentials, and a relay operable by the output of said power tube for controlling the operation of said servomotor.

8. In a device for controlling and stabilizing an airplane equipped with means for detecting movement of the airplane about at least one of its axes and with means for operating the controls of the airplane in accordance with the effect produced by said detecting means, means for operating said controls in accordance with variations in a controlling voltage comprising in combination means for expressing the magnitude of movement of the airplane about at least one of its axes in terms of an alternating current voltage which is a function of said magnitude, means for rectifying said voltage, a circuit including a condenser into which said rectified voltage is impressed to develop a direct current voltage which is a function of the rate of deviation, two pairs of rectifiers through which said direct current is passed to develop said direct voltage irrespective of whether said alternating current voltage is increasing or decreasing, means for developing an alternating current voltage as a function of said rectified voltage when it exceeds a given value, means for varying said given value, and means for impressing said developed voltage upon said first voltage to form the controlling voltage.

9. In a device for controlling and stabilizing an airplane equipped with airplane controls and with means for detecting deviation about one of its axes, comprising in combination means for expressing the magnitude of this deviation in terms of an alternating current voltage which is a function of said magnitude, means for detecting the rate of said deviation, and means for expressing said rate of deviation in terms of an alternating current voltage which is a function of said rate, means for amplifying such rate-expressing alternating current voltage, means effective when the amplified rate-expressing voltage rises above a selected value to impress such amplified voltage on the first mentioned voltage, and means for operating the airplane controls in accordance with the resultant voltage by stages in which the operating means overruns the required adjustment of the controls and then is reversed to approach the required adjustment.

10. In a device for controlling and stabilizing an aircraft equipped with a gyroscope, aircraft controls and a servomotor for operating said controls, a potentiometer controlled by said gyroscope, means for impressing an alternating current voltage across said potentiometer, said potentiometer including a center tap connected with said gyroscope to move in accordance with deviations in movement of said aircraft, a second potentiometer, means for impressing an alternating current voltage across said second potentiometer, said second potentiometer having a center tap controlled by said servomotor and being at the same potential as the first mentioned center tap when both center taps are in central position whereby deviation of the aircraft or movement of the servomotor will result in a difference in potential between the two taps, means for expressing this difference in terms of alternating current voltage to operate said servomotor, a third potentiometer connected between the first mentioned center tap and ground and having a third center tap, an electron tube having a grid connected to said third center tap, a cathode connected to ground through a condenser and a resistor in parallel and a plate, and a transformer having its primary connected to said plate and its secondary connected to means whereby an amplified alternating voltage will be impressed on the first mentioned voltage to operate said servomotor accordingly.

WALTER J. HARSHBARGER.
DONALD R. PUTT.

REFERENCES CITED

The following references are of record in the file of this patent:

UNITED STATES PATENTS

| Number | Name | Date |
|---|---|---|
| 2,159,142 | Fischer | May 23, 1939 |
| 2,190,390 | Thiry | Feb. 13, 1940 |
| 2,310,954 | Hodgman | Feb. 16, 1943 |
| 2,317,383 | Hull | Apr. 27, 1943 |

FOREIGN PATENTS

| Number | Country | Date |
|---|---|---|
| 260,260 | Great Britain | Jan. 12, 1928 |

OTHER REFERENCES

A. P. C. Application of A. Kronenberger, Serial No. 367,329, published May 25, 1943.